United States Patent
Tobari et al.

(10) Patent No.: US 7,719,226 B2
(45) Date of Patent: May 18, 2010

(54) HIGHLY RESPONSIVE PERMANENT MAGNET MOTOR CONTROLLER

(75) Inventors: Kazuaki Tobari, Hitachiota (JP); Yoshitaka Iwaji, Hitachinaka (JP); Daigo Kaneko, Hitachi (JP); Hajime Uematsu, Narashino (JP); Masakazu Hase, Shizuoka (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 307 days.

(21) Appl. No.: 11/964,752

(22) Filed: Dec. 27, 2007

(65) Prior Publication Data

US 2008/0157709 A1    Jul. 3, 2008

(30) Foreign Application Priority Data

Dec. 28, 2006    (JP)    ............................... 2006-353651

(51) Int. Cl.
*H02P 23/00*    (2006.01)

(52) U.S. Cl. ........................ 318/807; 318/801; 318/812

(58) Field of Classification Search ............ 318/400.02, 318/400.04, 801, 807, 715, 717, 721, 805, 318/812, 811, 814
See application file for complete search history.

(56) References Cited

U.S. PATENT DOCUMENTS 5,811,956 A * 9/1998 Yamamoto .................. 318/801

FOREIGN PATENT DOCUMENTS

JP    2001-251889    9/2001

* cited by examiner

*Primary Examiner*—Karen Masih
(74) *Attorney, Agent, or Firm*—Antonelli, Terry, Stout & Kraus, LLP.

(57) ABSTRACT

Current command values are used instead of detected current values to estimate axis error by calculation. An axis error command value is generated according to a speed command value, and a difference between the generated axis error command value and the estimated axis error value is used to control an estimated frequency value.

6 Claims, 7 Drawing Sheets

HIGHLY RESPONSIVE PERMANENT MAGNET MOTOR CONTROLLER

CLAIM OF PRIORITY

The present application claims priority from Japanese application serial No. 2006-353651, filed on Dec. 28, 2006, the content of which is hereby incorporated by reference into this application.

FIELD OF THE INVENTION

The present invention relates to a position sensor-less vector control method applied to a permanent magnet motor.

BACKGROUND OF THE INVENTION

In technology for estimating axis error in a position sensor-less vector control method, as described in Japanese Patent Laid-open No. 2001-251889, voltage command values, detected current values, and a speed command value, which are outputs in vector control, are used to estimate axis error by calculation, and the calculated value is then used to estimate a frequency by calculation. The description in the control method also stipulates that command values for axis error are basically set to 0.

SUMMARY OF THE INVENTION

The method described in Japanese Patent Laid-open No. 2001-251889 can achieve highly responsive, highly stable control operation for motors having an electric time constant (ratio of an inductance to a resistance) that is small to a certain extent, i.e., for small- to medium-capacity motors. If the method is applied to motors having a comparatively large electric time constant, however, response in frequency estimation by calculation is restricted.

There has been a problem that when a speed command value is abruptly changed, excessive current is generated by large axis error caused during an acceleration or deceleration operation and thereby the operation efficiency is lowered.

An object of the present invention is to provide a highly responsive controller, for a permanent magnet motor, that can reduce axis error during an acceleration or deceleration operation to 0 and achieve a highly efficient operation, even for a motor having a electric time constant.

In one aspect of the invention, a current command value rather than a detected current value is used to estimate axis error by calculation.

In an another aspect of the invention, a command value for axis error is generated according to a speed command value, and a difference between the command value for axis error and an estimated axis error is used to control an estimated frequency value.

According to a preferred embodiment of the invention, axis error during an acceleration or deceleration operation can be reduced to 0 for motors having a small electric time constant (ratio of an inductance to a resistance) and motors having a large electric time constant, and thereby highly efficient operation can be achieved.

DESCRIPTION OF THE PREFERRED EMBODIMENTS

Embodiments of the present invention will be described below in detail with reference to the drawings.

First Embodiment

Figure 1:
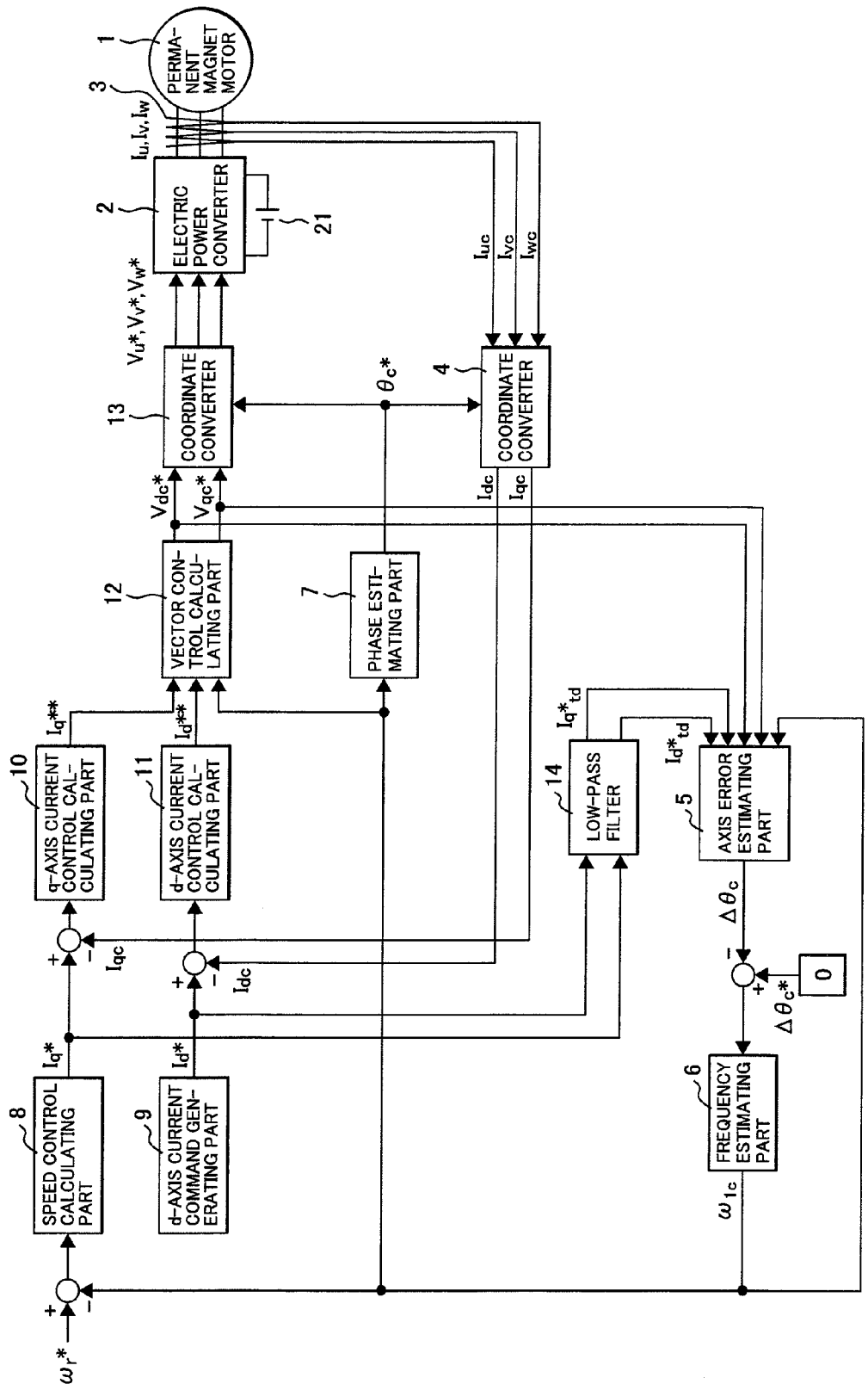
FIG. 1 is a block diagram showing an exemplary structure of a permanent magnet motor controller in an embodiment of the present invention.

FIG. 1 is a block diagram showing an exemplary structure of the permanent magnet motor controller in an embodiment of the present invention.

The permanent magnet motor 1 outputs a motor torque obtained by synthesizing a torque component due to the magnetic flux of a permanent magnet and a torque component due to inductance of the winding of a armature.

The electric power converter 2 outputs a voltage proportional to three-phase AC voltage command values Vu*, Vv*, and Vw* to change the output voltage and revolutions of the permanent magnet motor 1.

The DC power supply 21 supplies a DC voltage to the electric power converter 2.

The current detector 3 detects three-phase AC currents Iu, Iv, and Iw of the permanent magnet motor 1.

The coordinate converter 4 outputs a detected current value Idc of the d-axis and a detected current value Iqc of the q-axis according to detected values Iuc, Ivc, and Iwc of the three-phase AC currents Iu, Iv, and Iw and to an estimated phase value $\theta c^*$.

The axis error estimating part 5 estimates axis error, which is a difference between the estimated phase value $\theta c^*$ and the phase value $\theta$ of the motor, by calculation according to voltage command values Vdc* and Vqc*, an estimated frequency value $\omega 1c$, low-pass filter output values Id*td and Iq*td of first current command values Id* and Iq*, and motor constants, and outputs an estimated value $\Delta\theta c$.

The frequency estimating part 6 outputs an estimated frequency value $\omega 1c$ from a difference between the estimated axis error $\Delta\theta c$ and the axis error command value $\Delta\theta c^*$, which is 0.

The phase estimating part 7 integrates the estimated frequency value $\omega 1c$ and outputs an estimated phase value $\theta c^*$ to coordinate converters 4 and 13.

The speed control calculating part 8 outputs a first q-axis current command value Iq* from a difference between a speed command value $\omega r^*$ and the estimated frequency value $\omega 1c$.

The d-axis current setting part 9 outputs a first d-axis current command value Id*.

The q-axis current control calculating part 10 outputs a second q-axis current command value Iq** from a difference between the first q-axis current command value Iq* and the detected current value Iqc.

The d-axis current control calculating part 11 outputs a second d-axis current command value Id** from a difference between the first d-axis current command value Id* and the detected current value Idc.

The vector control calculating part 12 outputs d-axis and q-axis voltage command values Vdc* and Vqc* according to electric constants of the permanent magnet motor 1, the second current command values Id and Iq, and the estimated frequency value $\omega 1c$.

The coordinate converter 13 outputs three-phase current voltage command values Vu*, Vv*, and Vw* from the voltage command values Vdc* and Vqc* and the estimated phase value $\theta c^*$.

The low-pass filter 14 receives the first d-axis and q-axis current command values Id* and Iq* and outputs current command values Id*td and Iq*td used by the axis error estimating part 5.

A basic voltage and phase control method will be described first.

In a basic operation for voltage control, the d-axis current control calculating part 10 and q-axis current control calculating part 11 respectively use the first current command values Id* and Iq*, which are supplied from upstream, and the current detected values Idc and Iqc to calculate the second current command values Id and Iq, which are intermediate values used in vector control calculation.

The vector control calculating part 12 uses the second current command values Id and Iq, estimated frequency value $\omega 1c$ value, and motor constant settings to calculate the voltage command valued Vdc* and Vqc* indicated in equation (1), and controls the three-phase AC voltage command values Vu*, Vv*, and Vw* of the inverter.

[Equation 1]

$$\begin{bmatrix} Vdc^* \\ Vqc^* \end{bmatrix} = \begin{bmatrix} R^* & -\omega_1 \cdot Lq^* \\ \omega_1 \cdot Ld^* & R^* \end{bmatrix} \cdot \begin{bmatrix} Id^{} \\ Iq^{} \end{bmatrix} + \begin{bmatrix} 0 \\ \omega_1 \cdot Ke^* \end{bmatrix} \quad (1)$$

where

R: resistance
Ld: d-axis inductance
Lq: q-axis inductance
Ke: induced voltage coefficient
*: setting In a basic operation for phase control, the axis error estimating part 5 uses the voltage command values Vdc* and Vqc*, the low-pass filter output values Id*td and Iq*td of the first current command values Id* and Iq*, the estimated frequency value $\omega 1c$, and the motor constant setting to estimate axis error $\Delta\theta$ (=$\theta c^*$–0), which is a difference between the estimated phase value $\theta C^*$ and motor phase value $\theta$, from equation (2)

[Equation 2]

$$\Delta\theta_c = \tan^{-1}\left[\frac{Vdc^* - R^* \cdot Id_{td}^* + \omega_{1c} \cdot Lq^* \cdot Iq_{td}^*}{Vqc^* - R^* \cdot Iq_{td}^* - \omega_{1c} \cdot Lq^* \cdot Id_{td}^*}\right] \quad (2)$$

The frequency estimating part 6 controls the estimated frequency value $\omega 1c$ by calculation according to equation (3) so that the estimated axis error $\Delta\theta c$ becomes 0.

[Equation 3]

$$\omega_{1c} = -\Delta\theta c \cdot \left[Kp \frac{Ki}{S}\right] \quad (3)$$

where

Kp: proportional gain
Ki: integral gain

The proportional gain Kp and integral gain Ki are set as in equation (4).

[Equation 4]

$$\begin{bmatrix} Kp = 2\pi \cdot F_{PLL} \\ Ki = \frac{(2p \cdot F_{PLL})^2}{N} \end{bmatrix} \quad (4)$$

where

N: ratio of break points for the proportional gain and integral gain in the frequency estimating part 6 [times]

$F_{PLL}$: control response frequency of the frequency estimating part 6 [Hz]

The phase estimating part 7 uses the estimated frequency value $\omega 1c$ to control the estimated phase value $\theta c^*$ by the calculation indicated by equation (5).

[Equation 5]

$$\theta c^* = \omega_1 c \cdot \frac{1}{S} \quad (5)$$

This completes the explanation of the basic operation for phase control.

Now, effects provided by using the first current command values Id* and Iq*, which are a feature of the present invention, in the axis error estimating part 5 will be described.

Control characteristics in a conventional control method in which the detected current values Idc and Iqc are used will be described first.

Figure 2:
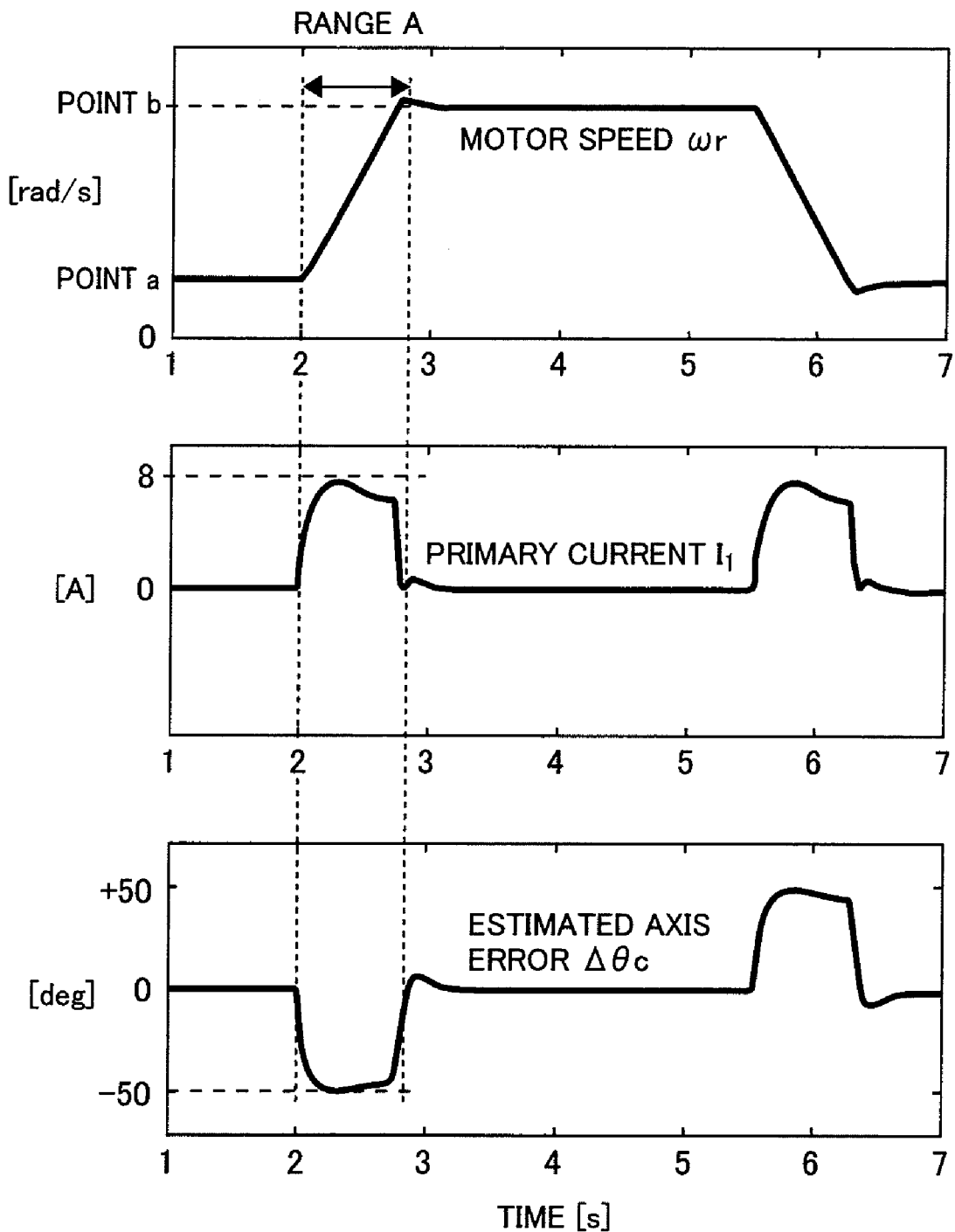
FIG. 2 is graphs illustrating operation characteristics when a control response frequency $F_{PLL}$, which is set in a frequency estimating part 6, is low.

FIG. 2 illustrates operation characteristics when the control response frequency $F_{PLL}$, which is set in the frequency estimating part 6, is low.

The drawing indicates that the estimated axis error $\Delta\theta c$ amounts to −50 deg in the range A during which acceleration is carried out from a low-speed point "a" to a maximum-speed point "b" and that the motor current I1 is 8 A.

Figure 3:
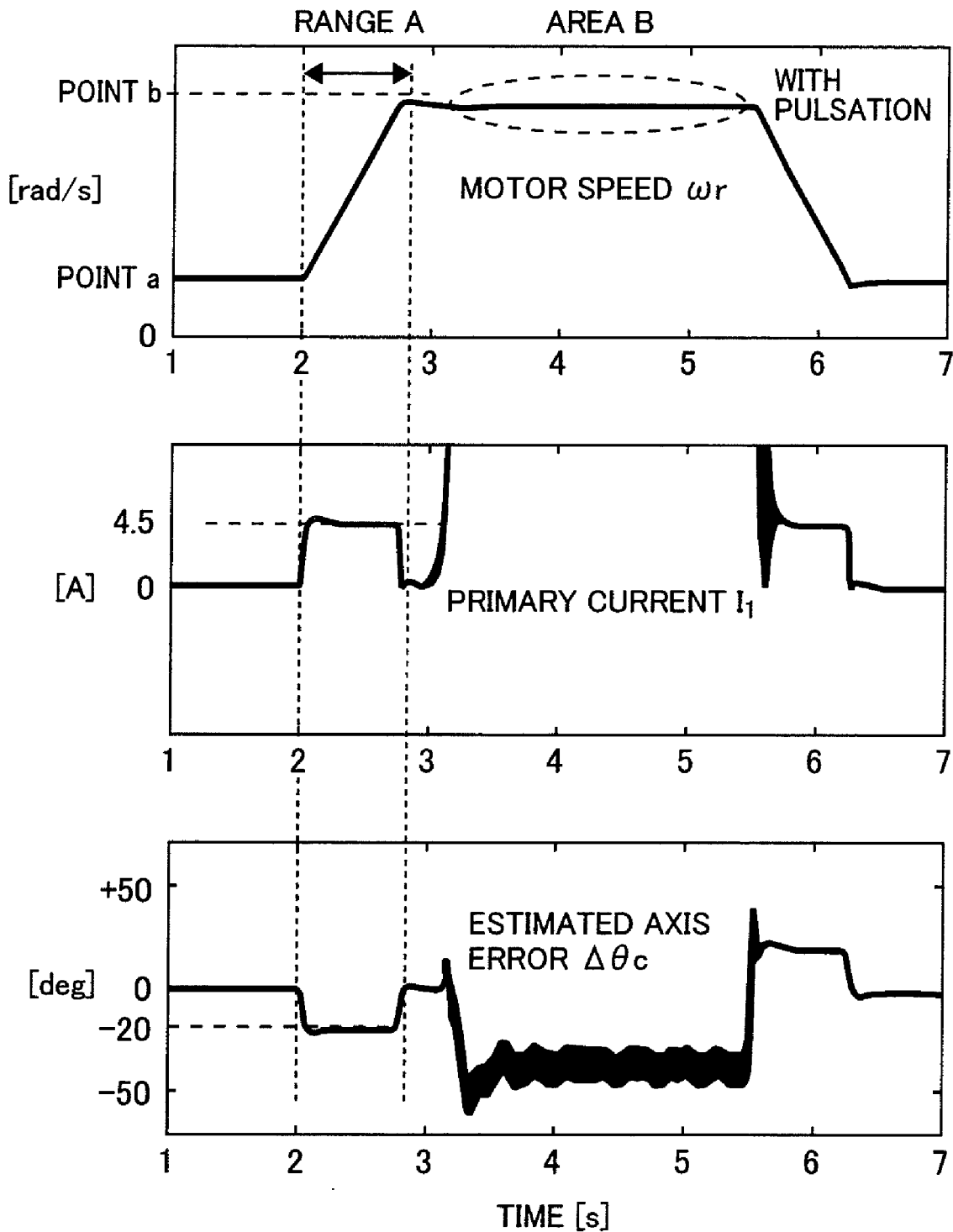
FIG. 3 is graphs illustrating operation characteristics when the control response frequency $F_{PLL}$, which is set in the frequency estimating part 6, is high.

FIG. 3 illustrates operation characteristics when the control response frequency $F_{PLL}$ is high.

The drawing indicates that the estimated axis error $\Delta\theta c$ is reduced to −20 deg in the range A and thereby the motor current I1 is reduced from 8 A to 4.5 A.

In the region B in which the number of revolutions is kept maximized, the calculated value $\Delta\theta c$ is always −50 deg and pulsation is generated in the motor speed $\omega r$.

This pulsation is problematic because it causes noise and stops operation due to an overcurrent.

Accordingly, when a low control response frequency $F_{PLL}$ is set in the frequency estimating part 6, large axis error is generated, increasing the motor current I1 and thereby reducing the motor efficiency.

When the $F_{PLL}$ is high, the axis error tends to be suppressed, but it may become unstable.

The cause why the estimated $\Delta\theta c$ becomes unstable when a high $F_{PLL}$ is set will be then described below.

When there is a difference between the estimated phase value $\theta c^*$ and the phase value $\theta$ of the motor, i.e., axis error $\Delta\theta$ ($=\theta c^*-\theta$), a matrix of conversion from the control side (dc-qc) to the motor axes (d-q) is obtained from equation (6).

[Equation 6]

$$\begin{bmatrix} d \\ q \end{bmatrix} = \begin{bmatrix} \cos(\Delta\theta) & -\sin(\Delta\theta) \\ \sin(\Delta\theta) & \cos(\Delta\theta) \end{bmatrix} \cdot \begin{bmatrix} dc \\ qc \end{bmatrix} \quad (6)$$

The d-axis and q-axis voltages Vd and Vq are represented by equation (8).

[Equation 7]

$$\begin{bmatrix} Vd \\ Vq \end{bmatrix} = \begin{bmatrix} \cos(\Delta\theta) & -\sin(\Delta\theta) \\ \sin(\Delta\theta) & \cos(\Delta\theta) \end{bmatrix} \cdot \begin{bmatrix} Vdc^* \\ Vqc^* \end{bmatrix} \quad (7)$$

Equation (8) indicates that the d-axis voltage Vd includes information about the q-axis voltage command value Vqc*.

When the voltage Vd changes, the d-axis current Id, the q-axis voltage Vq, and the q-axis current Iq also change in that order. Since the axis error estimating part 5 uses the detected current values Idc and Iqc for calculation, an unstable loop related to the estimated axis error $\Delta\theta c$ is generated.

A loop transfer function $G\Delta\theta(s)$ from the axis error command value $\Delta\theta c^*$ to the estimated axis error $\Delta\theta c$ is obtained as follows.

[Equation 8]

$$G_\theta(s) = \frac{2\pi \cdot F_{PLL} \cdot \overline{\omega_r^2} \cdot Ld \cdot Lq^*}{Ld \cdot Lq \cdot S^3 + (Ld + Lq) \cdot R \cdot S^2 + (R^2 + \overline{\omega_r^2} \cdot Ld \cdot Lq) \cdot S} \quad (8)$$

where $\omega r$: average motor speed

Figure 4:
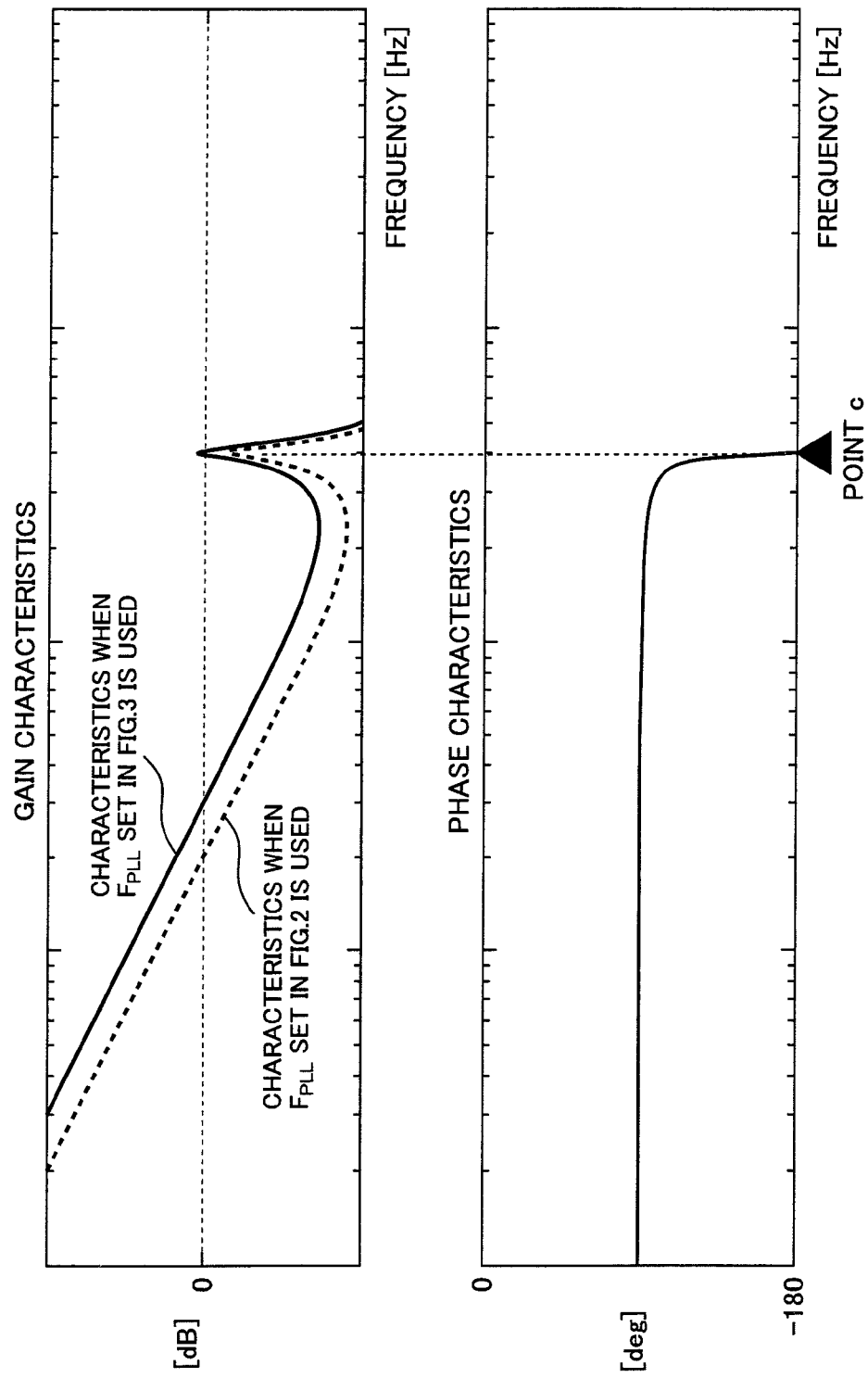
FIG. 4 is graphs illustrating frequency characteristics in a range from an axis error command value $\Delta\theta c^*$ to an estimated value $\Delta\theta c$.

FIG. 4 illustrates frequency characteristics obtained by setting the average motor speed $\omega r$ to a maximum number of revolutions in equation (8) and assigning the control response frequency $F_{PLL}$ set for the characteristics in FIGS. 2 and 3 to equation (8).

The characteristics set in FIG. 2 and the characteristics set in FIG. 3 are represented by a dotted line and a solid line, respectively.

The characteristics in FIG. 4 indicates that, at point c (=−180 deg) in the phase characteristics, the characteristics (dotted line) set in FIG. 2 is stable at 0 dB (=1) or less and the characteristics (solid line) set in FIG. 3 is unstable at 0 dB (=1) or more.

That is, when the detected current values Idc and Iqc are used to estimate a frequency, if $F_{PLL}$ is high, the estimated axis error $\Delta\theta c$ becomes unstable.

To make the estimated axis error $\Delta\theta c$ stable, estimated current values are used to estimate a frequency.

The first current command values Id* and Iq* rather than the detected current values Idc and Iqc are used here to obtain primary delay signals Id*td and Iq*td indicated in equation (9) by calculation.

[Equation 9]

$$\begin{bmatrix} Id_{td}^* \\ Iq_{td}^* \end{bmatrix} = \begin{bmatrix} \frac{1}{1+Tacr \cdot S} \cdot Id^* \\ \frac{1}{1+Tacr \cdot S} \cdot Iq^* \end{bmatrix} \quad (9)$$

where

Tacr: Delay in current control response

The axis error estimating part 5 calculates the estimated $\Delta\theta c$ as obtained from equation (3) above.

Figure 5:
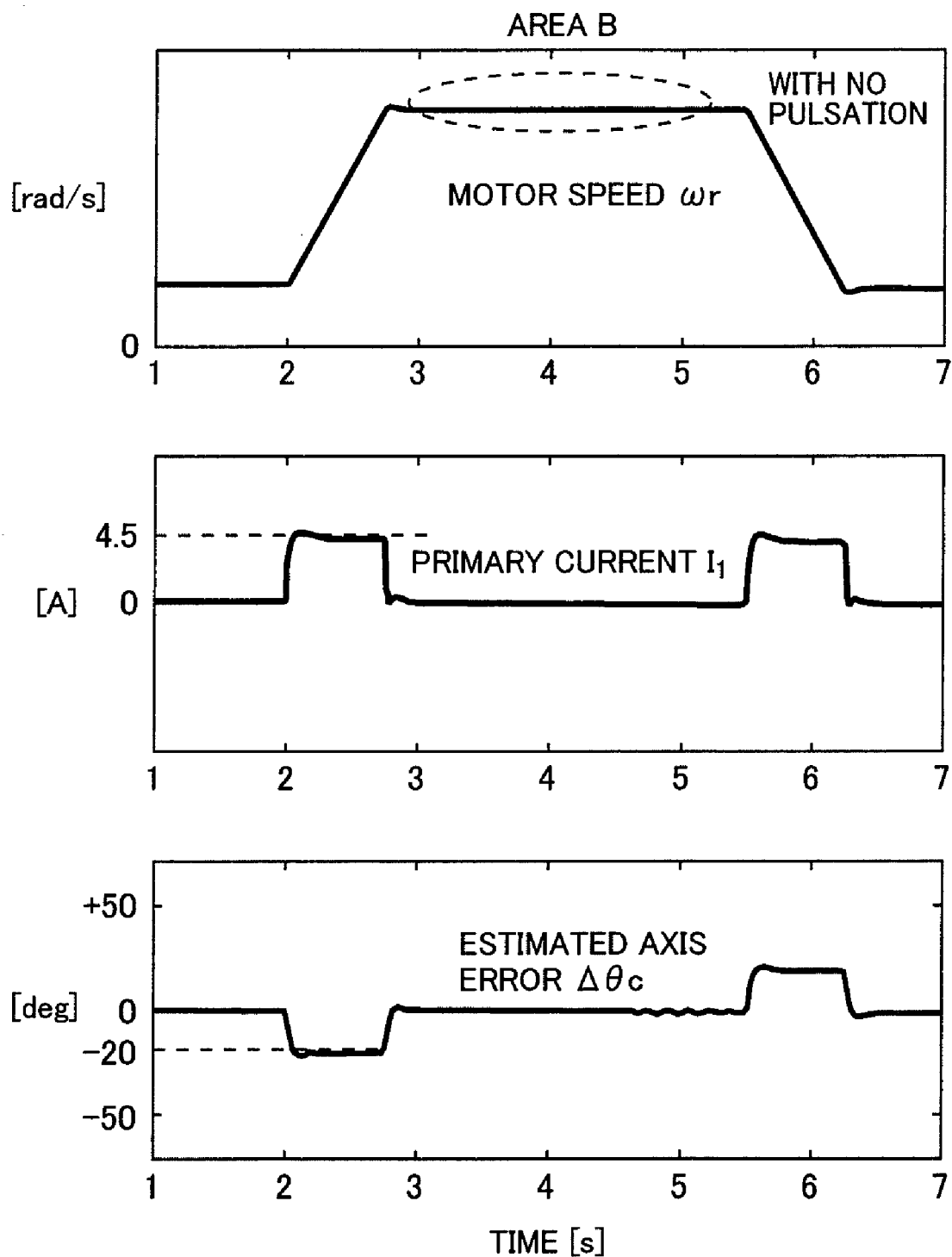
FIG. 5 is graphs illustrating operation characteristics when an embodiment of the present invention is used.

FIG. 5 shows characteristics when signals Id*td and Iq*td output from the low-pass filter 14 are used to estimate axis error (the same value as the $F_{PLL}$ in FIG. 3 is set).

Although the use of the detected current values Idc and Iqc has made operation unstable, the use of the signals Id*td and Iq*td output from the low-pass filter 14 ensures stable operation even in the region B.

Although, in this embodiment, the axis error estimating part 5 uses the signals output from the low-pass filter 14, if the control gains in the d-axis current command generating part 9 and speed control calculating part 8 are low and the motions of Id* and Iq*, which are output signals thereof, are slow, Id* and Iq* may be used instead of Id*td and Iq*td to estimate $\Delta\theta c$ by calculation.

Second Embodiment

In the method described in the first embodiment, to reduce axis error during acceleration or deceleration, the axis error command value $\Delta\theta c^*$ has been set to 0, and the current command values Id*td and Iq*td output from the low-pass filter have been used to estimate axis error. In this embodiment, an axis error command value $\Delta\theta c^*$ is generated from the speed command value $\omega r^*$ to further reduce the axis error.

Figure 6:
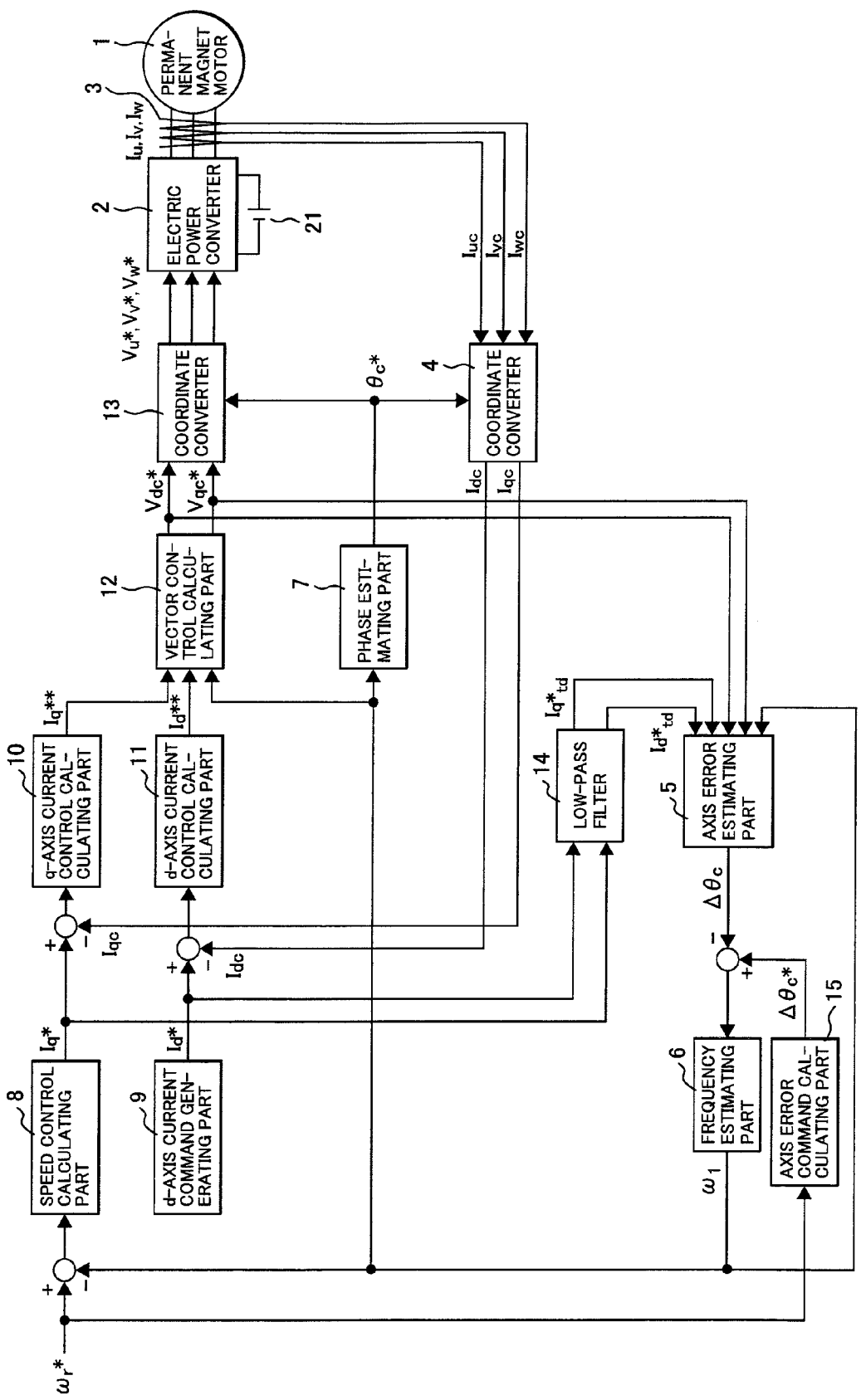
FIG. 6 is a block diagram showing an exemplary structure of a permanent magnet motor controller in another embodiment of the present invention.

FIG. 6 shows this embodiment.

The elements having reference numerals 1 to 14 and 21 in the drawing are identical to the elements having the same reference numerals in FIG. 1.

The axis error command calculating part 15 uses the speed command value $\omega r^*$ to output the axis error command value $\Delta\theta c^*$.

The principle of operation of the axis error estimating part 15, which is a feature of the present invention, will be described.

Described first is the value of the axis error $\Delta\theta$ (=estimated value $\Delta\theta c$) generated in the acceleration or deceleration region when the axis error estimating part 15 is not provided ($\Delta\theta c^*=0$).

The frequency estimating part 6 uses the estimated axis error $\Delta\theta c$ to calculate an estimated frequency value $\omega 1c$ from equation (3).

The relation between a change $\Delta\omega r$ in motor speed and a differential torque $\Delta\tau$ between the motor torque and the load torque is represented by equation (10).

[Equation 10]

$$\Delta\omega_r = \Delta t \cdot \frac{1}{J \cdot S} \cdot Pm \quad (10)$$

where
Pm: number of pole pairs of the motor
J: Synthesized inertia of the motor and machine [kgm²]

When equation (3) is equalized to equation (10), equation (4) is assigned to them, and the resulting equation is rewritten about the estimated value Δθc, equation (11) is obtained.

[Equation 11]

$$\Delta\theta c = -\frac{\Delta t \cdot \frac{1}{J} \cdot Pm \cdot \frac{N}{(2\pi \cdot F_{PLL})^2}}{\left[1 + \frac{N}{(2\pi \cdot F_{PLL})} \cdot S\right]} \tag{11}$$

This equation indicates that the estimated value Δθc is related to the ratio N of break points for the proportional gain and integral gain in the frequency estimating part 6 and to the control response frequency $F_{PLL}$.

When ωr* is equalized to ωr and equation (10) is differentiated, equation (12) is obtained.

[Equation 12]

$$\Delta\omega_r^* \cdot S = \Delta t \cdot \frac{1}{J} \cdot Pm \tag{12}$$

Equation (12) is then assigned to equation (11), and an axis error command value Δθc*, indicated in equation (13), that cancels the estimated value Δθc is generated.

[Equation 13]

$$\Delta\theta c^* = \frac{\frac{N}{(2\pi \cdot F_{PLL})^2} \cdot \Delta\omega_r^* \cdot S}{\left[1 + \frac{N}{(2\pi \cdot F_{PLL})} \cdot S\right]} \tag{13}$$

[Equation 14]

$$\Delta\theta c^* = \frac{N}{(2\pi \cdot F_{PLL})^2} \cdot \Delta\omega_r^* \cdot S \tag{14}$$

[Equation 15]

$$\begin{bmatrix} Vdc^* \\ Vqc^* \end{bmatrix} = \begin{bmatrix} R^* & -\omega_{1c} \cdot L^* \\ \omega_{1c} \cdot Ld^* & R^* \end{bmatrix} \cdot \begin{bmatrix} Id^* \\ Iq^* \end{bmatrix} + \begin{bmatrix} 0 \\ \omega_{1c} \cdot Ke^* \end{bmatrix} + \begin{bmatrix} \Delta Vd^* \\ \Delta Vq^* \end{bmatrix} \tag{15}$$

[Equation 16]

$$\begin{bmatrix} Vdc^* \\ Vqc^* \end{bmatrix} = \begin{bmatrix} R^* & -\omega_r^* \cdot L^* \\ \omega_r \cdot Ld^* & R^* \end{bmatrix} \cdot \begin{bmatrix} Id^* \\ Iqc_{td} \end{bmatrix} + \begin{bmatrix} 0 \\ \omega_r^* \cdot Ke^* \end{bmatrix} \tag{16}$$

Frequency estimation is controlled so that the estimated value Δθc matches the command value Δθc*.

Figure 7:
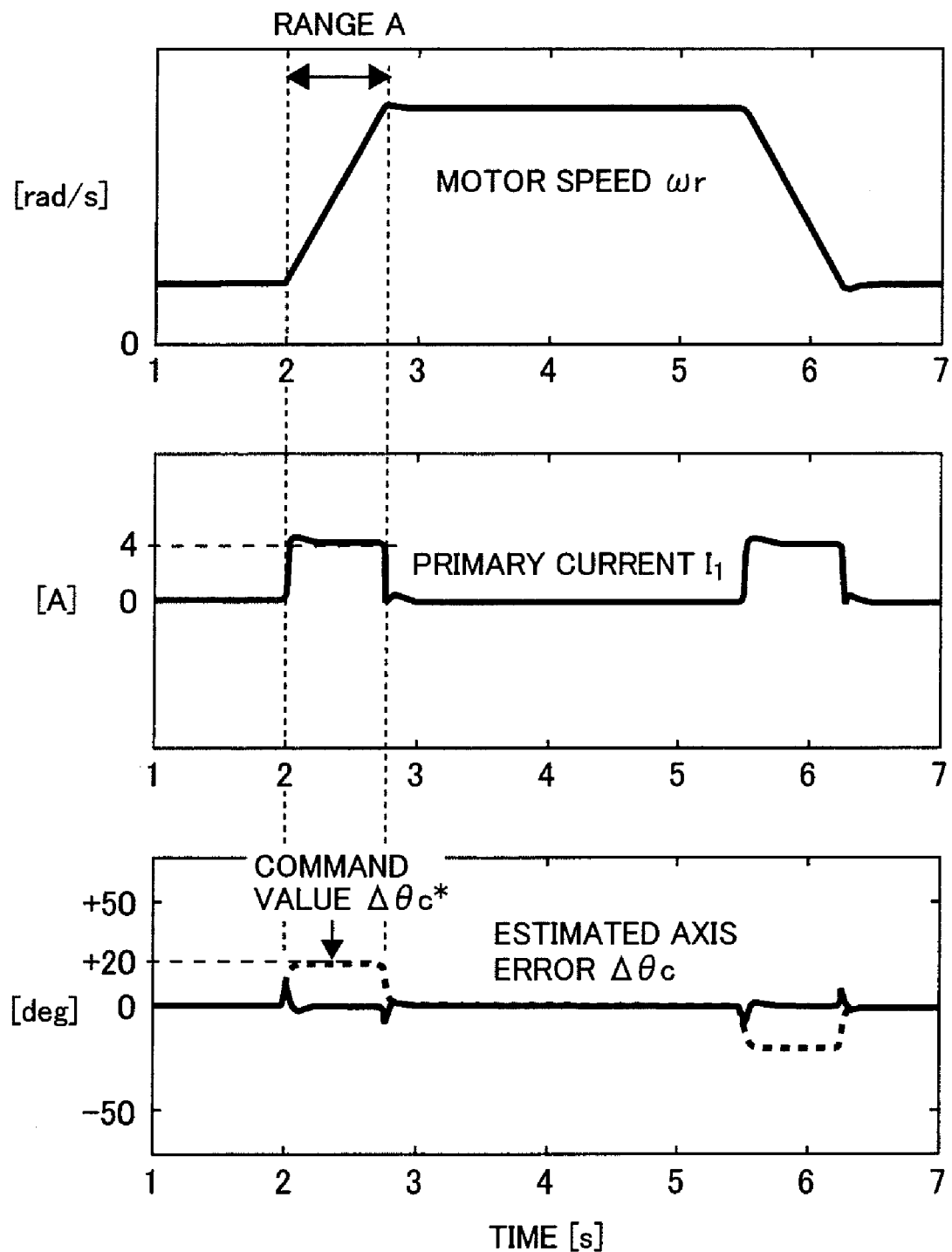
FIG. 7 is graphs illustrating operation characteristics when the other embodiment of the present invention is used.

FIG. 7 illustrates characteristics when the axis error command value Δθc* is used (the $F_{PLL}$ used in FIG. 3 is set).

The drawing indicates that the axis error command value Δθc*, indicated by a dashed line, that is calculated in the range A has a value of 20 deg on the positive side so that the Δθc in FIG. 5 is cancelled.

In this case, the estimated value Δθc (the actual axis error Δθ also has the same value) is 0 even in the range A and the motor current I1 is reduced down to 4 A, indicating that highly efficient operation can be performed.

Although the axis error command value Δθc* is calculated from equation (13) in this embodiment, the axis error can also be reduced by an approximate calculation as indicated by equation (14).

In the first and second embodiments, the first current command values Id* and Iq* and the detected current values Idc and Iqc have been used to generate the second current command values Id and Iq, and the generated current command values have been used to perform calculation for vector control. However, it is also possible to apply these embodiments to:

1) a vector control calculation method in which the first current command values Id* and Iq* and the detected current values Idc and Iqc are used to generate voltage compensated values ΔVd* and ΔVq* and the generated voltage compensated values and the first current command values Id* and Iq*, the estimated frequency value ω1c, and the electric constants of the permanent magnet motor 1 are used to calculate the voltage command values Vdc* and Vqc* according to equation (15), and 2) a control calculation method in which the first d-axis current command value Id* (=0), the primary delay signal Iqctd of the detected q-axis current value Iqc, the speed command value ωr*, and the electric constants of the permanent magnet motor 1 are used to calculate the voltage command values Vdc* and Vqc* according to equation (16).

In the methods in the first and second embodiments, an expensive current detector 3 has been used to detect three-phase AC currents Iu, Iv, and Iw. However, these embodiments can also be applied to a low-cost system in which DC current flowing in a one shunt resistor mounted to detect an overcurrent in the electric power converter 2 is used to reproduce three-phase motor currents Iuˆ, Ivˆ, and Iwˆ and the reproduced current values are used.

As described above, the present invention can suppress axis error during an acceleration or deceleration operation to 0 for motors having a small electric time constant (ratio of an inductance to a resistance) and motors having a large electric time constant, and can thereby achieve a highly efficient operation.

The present invention can also provide a highly responsive permanent magnet motor controller that can also be applied to an inexpensive current detecting system.

What is claimed is:

1. A permanent magnet motor controller that performs vector control calculation for controlling an output frequency and an output voltage of an electric power converter that drives a permanent magnet motor, a current control function being included in the vector control calculation, axis error estimation calculation for estimating axis error, which is a difference between an estimated phase value obtained by integrating an estimated frequency value and a phase value of the permanent magnet motor, and frequency estimation calculation for controlling a frequency so that the estimated axis error matches an axis error command value,
   wherein the axis error estimation calculating means uses a voltage command value output from the vector control calculating means, a current command value, a motor constant, and an estimated frequency value or speed command value to estimate the axis error by calculation.

2. A permanent magnet motor controller that performs vector control calculation for controlling an output frequency and an output voltage of an electric power converter that drives a permanent magnet motor, a current control function being included in the vector control calculation, axis error estimation calculation for estimating axis error, which is a difference between an estimated phase value obtained by integrating an estimated frequency value and a phase value of the permanent magnet motor, and frequency estimation calculation for controlling a frequency so that the estimated axis error matches an axis error command value, wherein the axis error estimation calculating means uses a voltage command value output from the vector control calculating means, a low-pass filter output value of a current command value, a motor constant, and an estimated frequency value or speed command value to estimate the axis error by calculation.

3. The permanent magnet motor controller according to claim 2, wherein the low-pass filter output value of the current command value is generated by using a primary delay signal according to a control response frequency or control gain set in current control.

4. A permanent magnet motor controller that performs vector control calculation for controlling an output frequency and an output voltage of an electric power converter that drives a permanent magnet motor, a current control function being included in the vector control calculation, axis error estimation calculation for estimating axis error, which is a difference between an estimated phase value obtained by integrating an estimated frequency value and a phase value of the permanent magnet motor, and frequency estimation calculation for controlling a frequency so that the estimated axis error matches an axis error command value, wherein the axis error command value is generated according to a speed control value.

5. A permanent magnet motor controller that performs vector control calculation for controlling an output frequency and an output voltage of an electric power converter that drives a permanent magnet motor, a current control function being included in the vector control calculation, axis error estimation calculation for estimating axis error, which is a difference between an estimated phase value obtained by integrating an estimated frequency value and a phase value of the permanent magnet motor, and frequency estimation calculation for controlling a frequency so that the estimated axis error matches an axis error command value, wherein the axis error command value is generated according to a low-pass filter value of a differentiated value of a speed command value.

6. The permanent magnet motor controller according to claim 5, wherein the low-pass filter value of the differentiated value of the speed command value is generated by using a primary delay signal according to a control response frequency or control gain set in frequency estimation.

* * * * *